United States Patent
Carnes

[11] Patent Number: 5,921,590
[45] Date of Patent: Jul. 13, 1999

[54] FLEXIBLE SWIVEL COUPLING FOR UNDERGROUND SPRINKLER SYSTEMS

[76] Inventor: Rickey J. Carnes, P.O. Box 131881, Tyler, Tex. 75713

[21] Appl. No.: 08/828,316

[22] Filed: Mar. 28, 1997

Related U.S. Application Data

[60] Provisional application No. 60/014,320, Mar. 29, 1996.

[51] Int. Cl.$^6$ .............................. A01G 25/00; F16L 55/00
[52] U.S. Cl. .............................. 285/181; 285/423; 285/5; 285/235; 285/397
[58] Field of Search ............................. 285/5, 181, 179, 285/235, 333, 355, 370, 383, 390, 397, 423

[56] References Cited

U.S. PATENT DOCUMENTS

| | | | |
|---|---|---|---|
| 3,315,986 | 4/1967 | Quick | 285/423 |
| 3,360,283 | 12/1967 | Guthrie | 285/383 |
| 3,540,223 | 11/1970 | Ebbe | 285/179 |
| 3,759,445 | 9/1973 | King | 285/5 |
| 4,314,717 | 2/1982 | Bjurman | 285/5 |
| 4,537,428 | 8/1985 | Landriault | 285/390 |
| 4,810,008 | 3/1989 | Brodie | 285/423 |
| 5,040,729 | 8/1991 | Carrozza | 239/201 |
| 5,078,430 | 1/1992 | St. Onge | 285/423 |
| 5,150,838 | 9/1992 | Roberts | 285/423 |
| 5,242,112 | 9/1993 | Dunn et al. | 239/201 |
| 5,383,692 | 1/1995 | Watts | 285/423 |

FOREIGN PATENT DOCUMENTS

| | | | |
|---|---|---|---|
| 143461 | 8/1980 | Germany | 285/181 |
| 726507 | 3/1955 | United Kingdom | 285/370 |

*Primary Examiner*—Eric K. Nicholson
*Attorney, Agent, or Firm*—Ronald B. Sefrna

[57] ABSTRACT

A flexible swivel coupling includes a a first elbow, a second elbow, and a flexible nipple connected between the two elbows. The first and second elbows are threaded on the interior surface of at least one of the legs of each elbow, and the flexible nipple is threaded at both ends, for connection between the two elbows. The outside diameter of the nipple, at least at the threaded ends, is slightly larger than the inside diameter of the threaded legs of the two elbows, so that the nipple threads are slightly compressed when the nipple is threaded into the elbows and forms a water tight seal without the need for o-rings or other additional sealing means.

13 Claims, 4 Drawing Sheets

FLEXIBLE SWIVEL COUPLING FOR UNDERGROUND SPRINKLER SYSTEMS

RELATED APPLICATION DATA

This application is a Continuation-In-Part of U.S. Provisional patent application Ser. No. 60/014,320, titled "Flexible Swivel Coupling For Underground Sprinkler Systems", filed Mar. 29, 1996, by the same inventor and applicant.

TECHNICAL FIELD

The present invention generally relates to fittings or coupling devices for irrigation or plumbing systems, and more specifically relates to a swiveling, flexible coupling particularly useful for connecting sprinkler heads to water distribution lines.

BACKGROUND OF THE INVENTION

In underground irrigation or sprinkler systems, particularly those used for watering lawns, water distribution lines are used to carry water from a main supply line to various parts of the area to be watered, and sprinkler heads are connected to the water distribution lines at selected points. The cost of labor for the installation of a sprinkler system is generally the largest portion of the total cost, so it is advantageous for designers and installers of sprinkler systems to utilize designs and components that will minimize the time required for installation. In terms of material cost, modern sprinkler system design utilizes inexpensive plastic piping (constructed of PVC or other suitable materials) for the water distribution lines, and those lines are usually the least costly element. The sprinkler heads are typically the most costly material item, although the cost of the coupling devices installed between the water distribution lines and the sprinkler heads can also be significant. It is advantageous, therefore, to design sprinkler systems to minimize material costs as well as labor costs.

In typical practice, the water distribution lines are buried at a single selected elevation and the connection between each sprinkler head and the distribution line is made with a "swing arm" that includes a number of elbows and joints to allow adjustment of the elevation of the sprinkler head relative to the distribution line. Although water distribution lines should be placed below the "freeze depth" in the soil, the lines are most commonly buried substantially deeper than required for freeze protection, especially in mild climates. The swing arms in common use are designed to allow an installer to manipulate the swing arm to adjust the sprinkler head elevation relative to the water distribution line, and include several elbows and connecting conduits for that purpose. An example may be found in U.S. Pat. No. 5,458,290 to Johnson (e.g., element 40 of FIG. 3). Such swing arms require relatively large excavations at each sprinkler head location, with relatively high installation cost. The use of a number of elbows, conduits, etc. in the swing arms not only increases the cost of the components and/or installation, but also results in significant pressure drop through the swing arm. Since most sprinkler systems include a substantial number of sprinkler heads, the cumulative effect of the pressure loss through the swing arms can be significant.

The use of swivel couplings to facilitate installation of swing arms is known in the art, but the swivel couplings disclosed by the prior art typically require the use of O-rings or more complex sealing arrangements, are relatively complex in structure, and require specially formed components. Examples of swivel coupling designs known in the prior art may be found in U.S. Pat. No. 4,998,755 to Reader, and in U.S. Pat. No. 5,040,729 to Carrozza.

The use of barbed fittings in a swing arm is disclosed by U.S. Pat. No. 5,242,112 to Dunn, et al. This approach does reduce the complexity of the joints in the swing arm, but connections made with barbed fittings are prone to leakage problems and can be relatively easily dislodged if the connected sprinkler head is disturbed by, for example, the impact of a mower. The swing arm designs known in the prior art also have little, if any, flexibility other than through movement of the joints, so they do not readily accommodate forces imposed by the impact of an object, such as a mower, against a sprinkler head attached to the swing arm.

Flexible risers or nipples are also known in the prior art, as exemplified by U.S. Pat. No. 4,314,717 to Bjurman, and can be used to provide a flexible extension for mounting a sprinkler head. While flexible risers can be effective in reducing the probability of damage to a sprinkler head, they do not alone provide a comprehensive coupling system that meets the need for economy, ease of installation, and effective protection.

There remains an unfilled need for a flexible swivel coupling for use in sprinkler systems, and particularly for the mounting of sprinkler heads, that is economical to produce, that facilitates design and installation of sprinkler systems so as to reduce the cost of both materials and labor, that provides effective protection against damage to sprinkler heads, and that facilitates the performance of necessary maintenance and repairs.

SUMMARY OF THE INVENTION

The present invention provides a flexible swiveling coupling device of simple and low cost construction, that significantly simplifies the sprinkler head installation, requires only a small excavation, and minimizes pressure drop between distribution line and sprinkler head. The coupling of the invention also cushions and absorbs the shock of impact against a sprinkler head connected thereto, and thus reduces the probability of damage to the sprinkler system after installation.

The coupling device of the invention generally comprises a first elbow, a flexible nipple, and a second elbow. The first and second elbows are threaded on the interior surface of at least one of the legs of each elbow, and the flexible nipple is threaded at both ends, for connection between the two elbows. The outside diameter of the nipple, at least at the threaded ends, is slightly larger than the inside diameter of the threaded legs of the two elbows, so that the nipple threads are slightly compressed when the nipple is threaded into the elbows and forms a water tight seal without the need for o-rings or other additional sealing means. Since the nipple is sealed against each elbow through the total length of the mating threads, each elbow can be rotated relative to the nipple without breaking the seal and allowing the passage of water through the threaded connection.

The flexible nipple extending between the two elbows has sufficient lateral flexibility to accommodate and absorb movement of one elbow without causing movement of the other elbow. Therefore, if a sprinkler head connected to one elbow is hit by a mower or other object, the force of the impact will be absorbed by the nipple, leaving the second elbow and the remainder of the sprinkler system isolated from the effects of the impact. In the event that a lateral force exceeds the lateral flexibility of the nipple, the force will cause the nipple threads to pull out from the elbow rather than causing damage to the sprinkler head. Since sprinkler heads are significantly more costly than the coupling device, the "designed failure" of the coupling device minimizes the cost of repair by directing the damage to the less costly component.

The nipple also has sufficient torsional flexibility to absorb impact forces that are imposed from a direction so as to impose a twisting force on the coupling device, and similarly isolate the remainder of the system from those forces. Twisting forces that exceed the torsional flexibility of the nipple will cause relative movement between the nipple and at least one elbow through the threaded connection, thereby absorbing the force without destruction of system components.

The structure and features of the coupling device of the invention will be described in more detail with reference to the accompanying drawing figures.

DESCRIPTION OF THE PREFERRED AND ALTERNATIVE EMBODIMENTS

Figure 1:
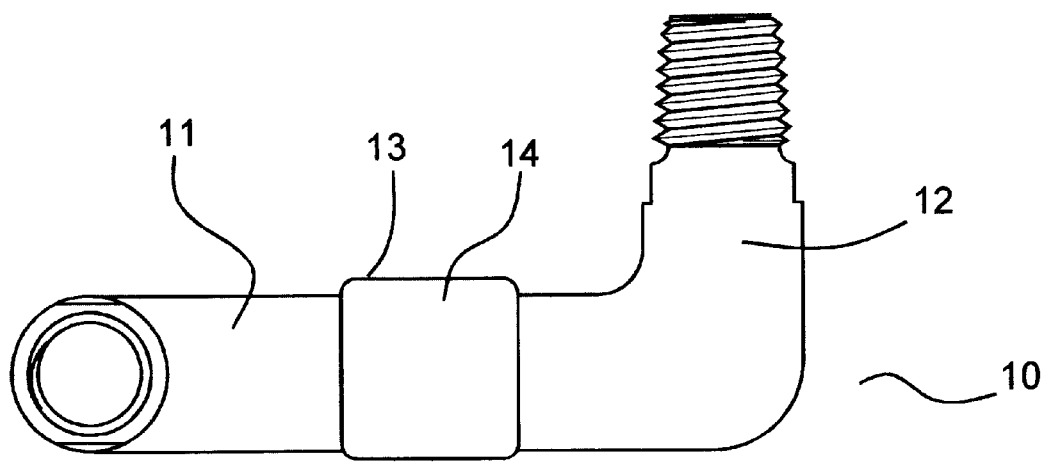
FIG. 1 is a side view of the preferred embodiment of the coupling device of the invention.
Figure 2:
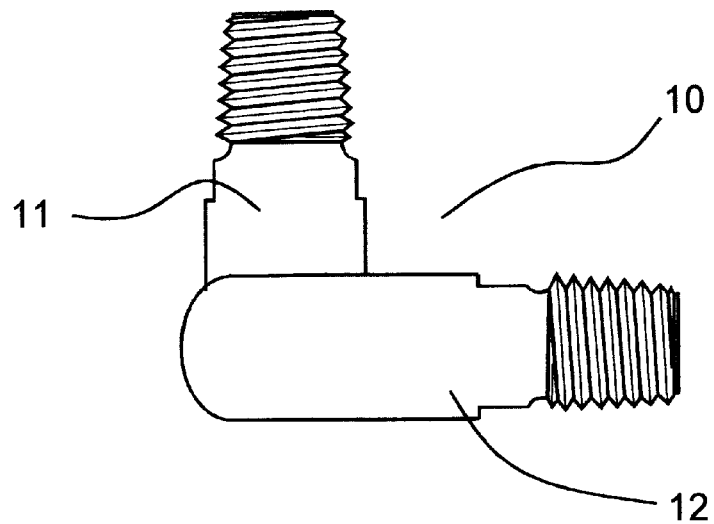
FIG. 2 is an end view of the preferred embodiment of the coupling device of the invention.
Figure 3:
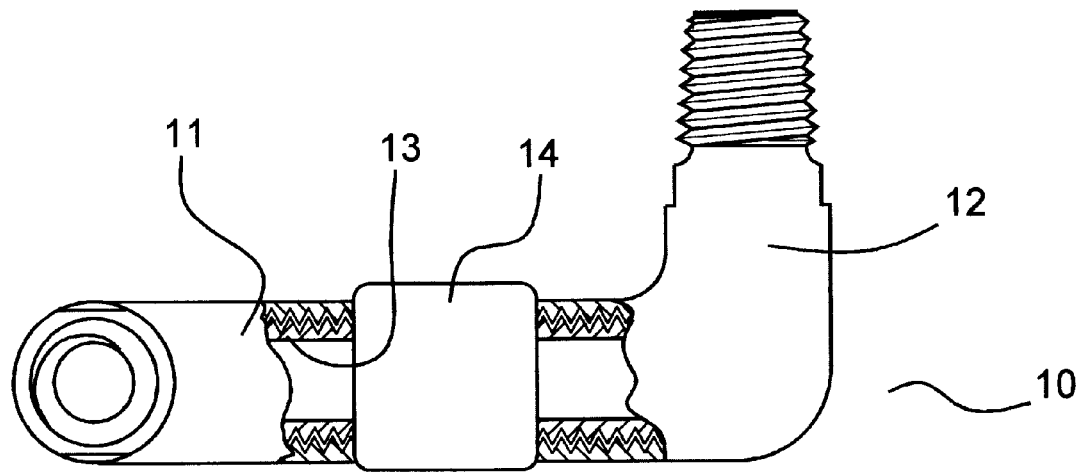
FIG. 3 is a partially sectioned side elevation view of the preferred embodiment of the coupling device of the invention.

In its preferred embodiment, the coupling device 10 of the invention includes a pair of 90 degree elbows, 11 and 12, with a securely sealing flexible nipple 13 connected between the elbows, to allow swivel or rotational movement of the elbows around the longitudinal axis of the nipple, and to allow both lateral and torsional flexing of the coupling relative to the longitudinal axis of the nipple.

Each elbow component of the coupling device is rigid, and is threaded on the inner surface of one of the legs of the elbow. The preferred embodiment of the device is designed for use in sprinkler systems constructed of PVC or other plastic material, and both elbows are accordingly preferably constructed of PVC, although it will be understood that any material suitable for use in plumbing installations in general and sprinkler systems in particular may be utilized if desired. In the preferred embodiment, elbow 11 and elbow 12 are both female threaded at the end which receives nipple 13 and are both male threaded with external threads at their opposite, or outer, ends. In the preferred embodiment, elbows 11 and 12 are identical components, disposed in generally mirrored relationship. The male threaded end of elbow 11 is designed to be threaded into a female threaded coupling in the water line to which a sprinkler head is to be connected, and the male threaded end of elbow 12 is designed to receive a conventional sprinkler head. It is preferred that the male threaded portion of at least elbow 12, i.e., to which a sprinkler head is to be connected, be reinforced to reduce the possibility that the male threaded portion of the elbow will break away from the remaining portion if excessive force is applied during, especially, removal of a sprinkler head. Elbow 11 may be similarly reinforced if desired.

Figure 8:
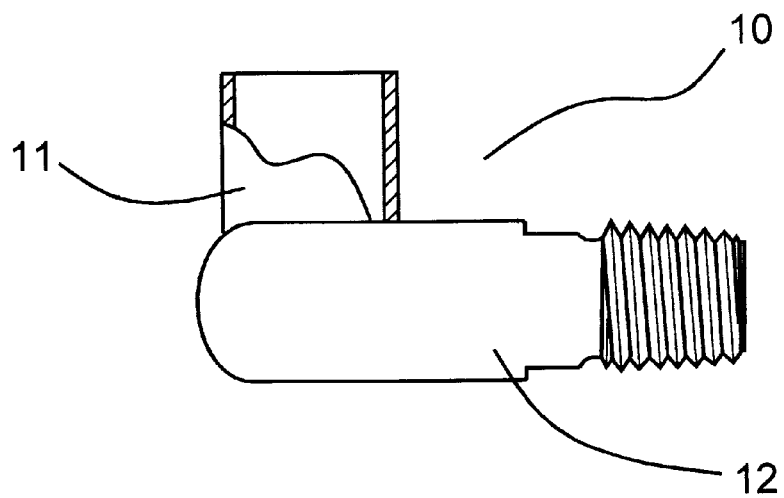
FIG. 8 is a side view of a second alternative embodiment of the coupling device of the invention.

In an alternative embodiment of the coupling, illustrated in FIG. 8, elbow 11 is not threaded at its outer end, but is constructed with a smooth glue joint fitting at the outer end, to receive the un-threaded end of a water line. This alternative embodiment can be used to eliminate the need for an additional coupling at the end of a water line to which a sprinkler head is to be attached.

The nipple 13 connecting the two elbows is formed of a compressible, flexible material such as polyethylene. The outer surface of each end of the nipple is male threaded to mate with the internally threaded portion of each elbow, and the nipple is dimensioned relative to the elbows such that the nipple threads are slightly compressed when mated with the elbow threads. The compression of the nipple threads facilitates formation of a water tight seal between the nipple and elbows that prevents water from flowing along the thread path between those components even when each elbow is not fully threaded onto the nipple. Therefore, each elbow may be rotated through at least one complete turn around the nipple on the threaded connection without causing the connection to leak, allowing adjustment of the angle between the inlet of the first elbow and the outlet of the second elbow.

The orientation of the components of the coupling device assures that the longitudinal axis of the outer end of elbow 12, to which a sprinkler head is connected, is never parallel to the longitudinal axis of nipple 13 or the longitudinal axis of the outer end of elbow 11, thereby assuring that neither the threaded connection between the elbows and the nipple nor the threaded connection between elbow 11 and a water line is affected when a sprinkler head is threaded onto or off of the outer end of elbow 12. Since the rotational forces imposed on the sprinkler head cannot induce movement in the threaded connections between the elbows and the nipple or between elbow 11 and the water line, sprinkler heads may be installed and removed without inadvertently disturbing the remainder of the system.

The nipple 13 is of sufficient length that the elbows 11 and 12 are positioned on the nipple with their adjacent ends separated from each other with the nipple extending through the space separating them. The nipple is accordingly allowed to flex laterally, accommodating lateral movement of one elbow without transmitting that movement to the other elbow, thus allowing the coupling to absorb the shock of impact against a sprinkler head connected to elbow 12 and minimize the possibility of resulting damage to the distribution line, the sprinkler head, or the coupling.

It is preferred that the nipple 13 also be torsionally flexible, especially in its central portion, so that the nipple will twist slightly around its longitudinal axis before the twisting force causes movement in the threaded connection between the nipple and either elbow, thus allowing the nipple to absorb small and brief torsional forces that may be imposed by impact against the sprinkler head without affecting the desired orientation of the elbow components relative to each other.

More extensive and sustained impact forces can also be accommodated by the coupling device of the invention without damage to major sprinkler system components. When a sustained force of sufficient magnitude is imposed on a sprinkler head the sprinkler head will be displaced in response to the force. When the displacement is in a direction that results in the imposition of torsional, or twisting, forces on nipple 13 and the displacement exceeds the torsional flexibility range of the nipple, the excess displacement is absorbed by movement in the threaded connections between the elbows and the nipple of the coupling device. Because the force required to cause movement in the threaded connections between the elbows and the nipple of the coupling device is less than the force required to break the sprinkler head or the water line, the possibility of sprinkler head or water line failure is greatly reduced if not completely eliminated, and the system components may be easily and quickly realigned.

The coupling device of the invention will also minimize system damage when a heavy, sustained force is imposed against a sprinkler head in a direction that imposes lateral force on nipple 13. When sprinkler head displacement is sufficient to exceed the lateral flexibility limit of the nipple, continued lateral movement will cause the resilient threads on one end of the nipple to strip away from the mating threads of the associated elbow. Although the connection between the nipple and elbow is thus broken and repair of the sprinkler system is required, the magnitude of the necessary repair is minimized. Because the threads of the nipple are resilient and compressible, they may not be damaged by the forced separation from the elbow and the coupling device can be repaired by simply reconnecting the nipple and the elbow. Because the nipple threads are constructed of softer material than the elbow threads, any thread damage will be confined to the nipple threads, and if thread damage has occurred, the nipple, or the complete coupling device, may be easily replaced. In any event, because the coupling device is designed to fail before either the sprinkler head or the water line, the coupling device serves to protect those more significant system components and therefore minimizes both the cost and the time associated with any necessary repairs.

An enlarged compressible cushion portion 14 is preferably provided, though not required, in the central portion of nipple 13, so that each elbow may be threaded onto the nipple against the cushion while still allowing the nipple the desired flexibility. The cushion portion 14 functions to assist in sealing against water leakage and against the incursion of foreign matter, such as sand, into the connections between nipple 13 and the elbows 11 and 12. The cushion portion of the nipple also enhances the ability of the nipple to absorb and dissipate the forces resulting from impact against a sprinkler head connected to the coupling device.

Figure 4:
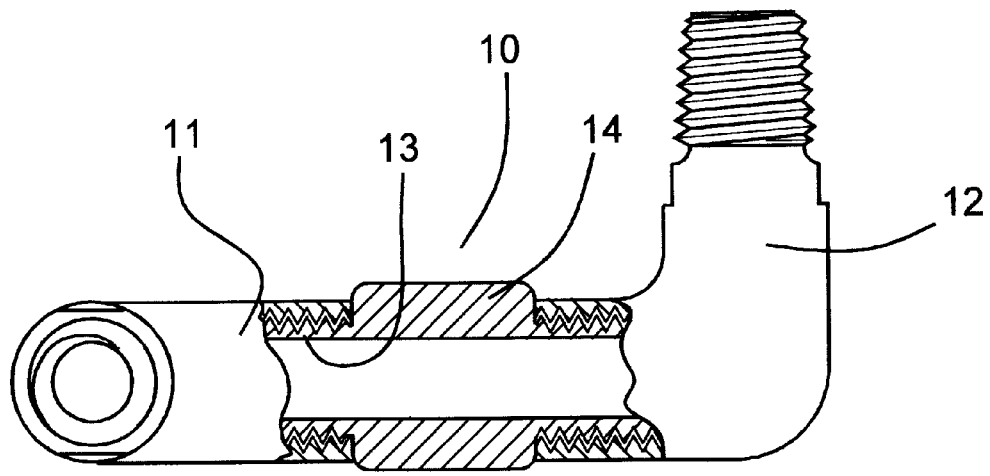
FIG. 4 is a partially sectioned side elevation view of the preferred embodiment of the coupling device of the invention, as in FIG. 3, showing the construction of the nipple and cushion in more detail.
Figure 5:
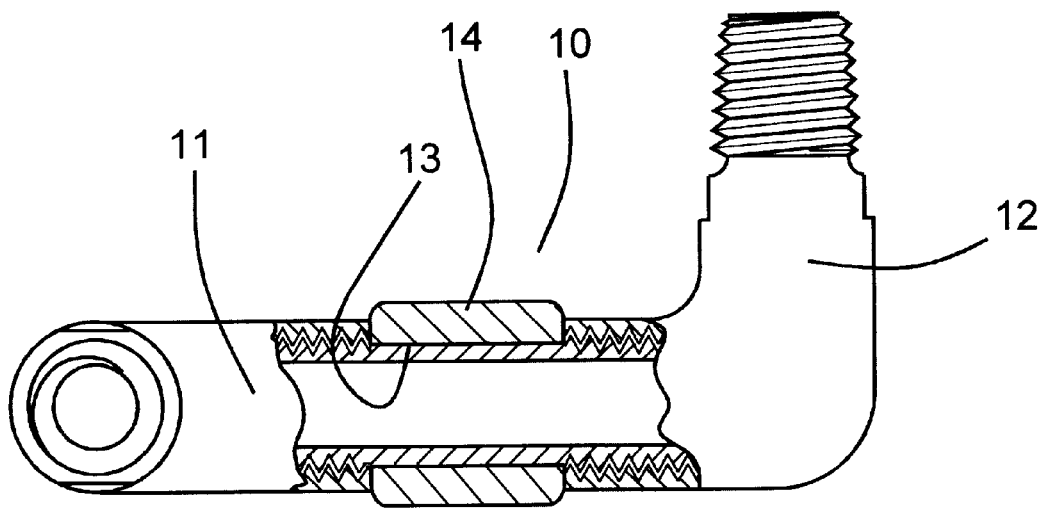
FIG. 5 is a partially sectioned side elevation view of the coupling device of the invention, showing an alternative embodiment of the construction of the nipple and cushion.
Figure 6:
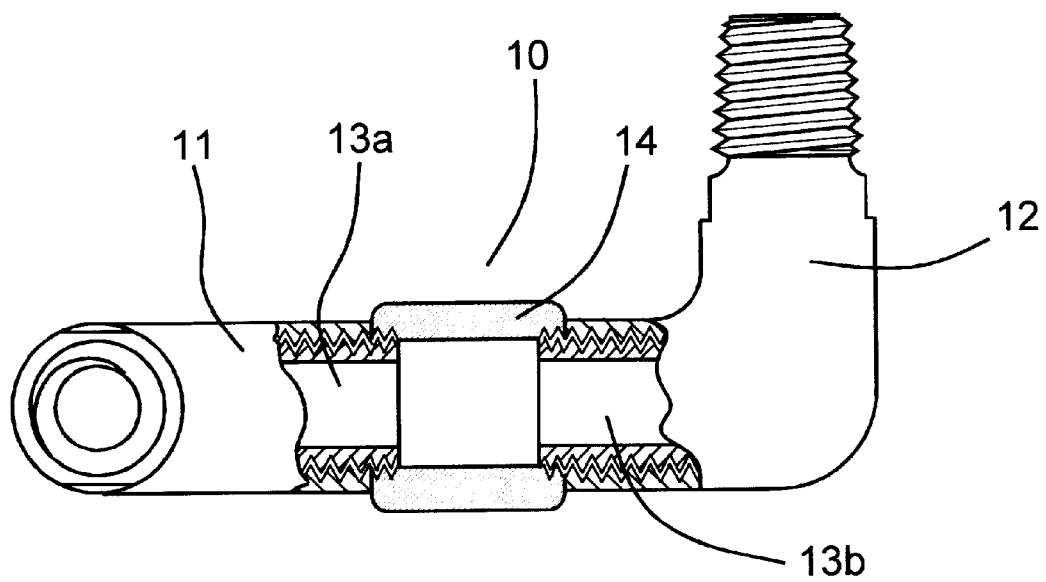
FIG. 6 is a partially sectioned side elevation view of the coupling device of the invention, showing a further alternative embodiment of the construction of the nipple and cushion.
Figure 7:
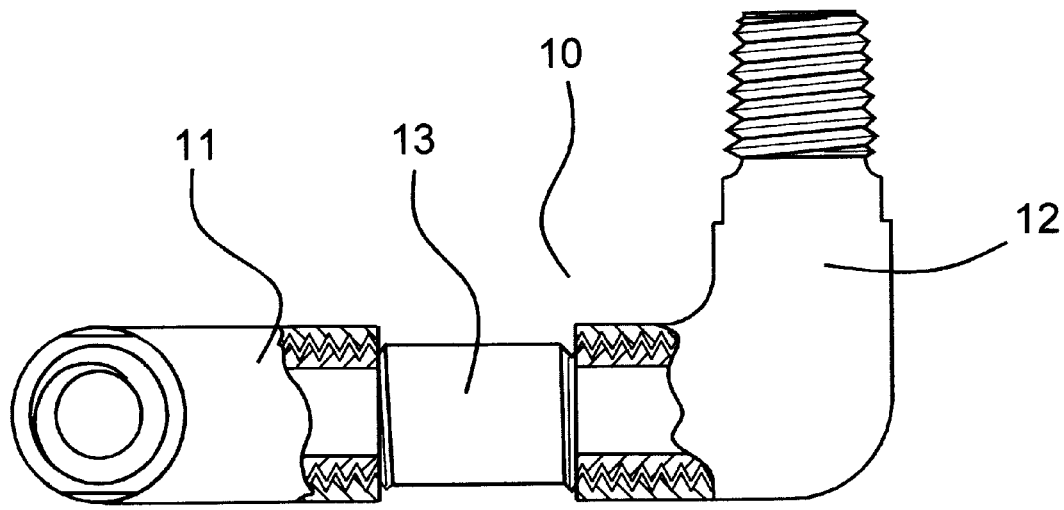
FIG. 7 is a partially sectioned view of an alternative embodiment of the coupling device of the invention.

In the preferred embodiment cushion 14 is an integral part of nipple 13, as illustrated in FIG. 4, but the nipple and cushion may be formed as separate components if desired as an alternative embodiment, as shown in FIG. 5, and the cushion 14 slid over the exterior of nipple 13 during assembly of the coupling device. However, if a separate cushion component is used the ability of the nipple structure to absorb and dissipate impact shocks will be reduced, since the impact forces will not be as readily transmitted from the nipple to the cushion, and this approach is not preferred. Cushion 14 may be formed of the same material as nipple 13, or may be formed of a softer, more resilient material. In a further alternative embodiment, shown in FIG. 6, nipple 13 may be divided into a first connector 13a and a second connector 13b, each interconnected at one end to opposite ends of cushion 14 by threading, gluing, or other effective connection means. Another alternative embodiment of the coupling device, without a cushion, is illustrated in FIG. 7.

With the coupling device of the invention, water lines to individual sprinkler head locations may be positioned without concern about changes in elevation or about the angle of the feed line relative to the longitudinal axis of the sprinkler head. The outer end of elbow 11 is connected to the feed line and the orientation of elbow 12 is adjusted by rotating elbow 12 relative to elbow 11 until the outer end of elbow 12 is oriented vertically for proper placement of a sprinkler head. When the coupling device of the invention is used the need for over-excavation to accommodate the elongate arms of the typical swing arm used in the prior art is eliminated, significantly facilitating and speeding the installation of each sprinkler head. Installation of the entire sprinkler system is also facilitated, because any need to place lateral water lines at a specific elevation or in a level orientation can be effectively eliminated. Lines may be routed to avoid obstacles such as large rocks and tree roots, and may be placed at any convenient elevation consistent with freeze protection.

Accordingly, the coupling device of the invention is a significant factor in an improved method of sprinkler system installation, in which lateral lines to sprinkler head locations may be routed along the path of "least resistance" to the desired head location. So long as the lateral line terminates, or ends, at the desired location and the end of the line is at a sufficient depth to accommodate the sprinkler head to be installed, the angle at which the line approaches the sprinkler head location is of no consequence when the coupling device of the invention is used between the lateral line and the sprinkler head. Over excavation below the sprinkler head to accommodate a conventional swing arm is not required, and the time required for installation of each sprinkler head is reduced substantially.

The coupling device may also be advantageously used as a riser or riser extension at a sprinkler head location, by orienting elbows 11 and 12 so that the inlet to elbow 11 and the outlet from elbow 12 are parallel. Since the axis around which the sprinkler head is rotated during installation and removal is offset from the longitudinal axis of the initial riser extending from the lateral water line, a maintenance operator can much more easily ensure that rotating the sprinkler head will result only in removing the head from elbow 12 rather than in unscrewing the riser from its connection to the lateral line.

The foregoing description is illustrative and not for purposes of limitation. The invention is susceptible to additional modifications and alternative embodiments in addition to those described, all within the scope of the invention as claimed.

I claim:

1. A flexible coupling device, comprising
   a first elbow, formed as a hollow body with a first leg open at its outer end and having an outer surface and an inner surface, and a second leg open at its outer end and having an outer surface and an inner surface, with said second leg disposed at an angle relative to said first leg, said first leg including screw threads formed on said inner surface at said open end thereof;
   a second elbow, formed as a hollow body with a first leg open at its outer end and having an outer surface and an inner surface, and a second leg open at its outer end and having an outer surface and an inner surface, with said second leg disposed at an angle relative to said first leg, said first leg including screw threads formed on said inner surface at said open end thereof;

a flexible, hollow, open ended nipple with a first end and a second end, said nipple having an outer surface and an inner surface, including screw threads formed on said outer surface at said first end thereof and at said second end thereof, said first end of said nipple threaded into said open end of said first leg of said first elbow and said second end of said nipple threaded into said open end of said first leg of said second elbow, said first end of said nipple being slightly larger in outside cross-sectional dimension than the inside cross-sectional dimension of said open end of said first leg of said first elbow and said second end of said nipple being slightly larger in outside cross-sectional dimension than the inside cross-sectional dimension of said open end of said first leg of said second elbow so that said threads of said nipple are compressed to form a water tight seal against said threads of said first and second elbows; and a resilient annular cushion with first and second ends, said cushion disposed around said outer surface of said nipple between said screw threads at said first end of said nipple and said screw threads at said second end of said nipple, such that said first end of said cushion is received against said open end of said first leg of said first elbow and said second end of said cushion is received against said open end of said first leg of said second elbow.

2. The flexible coupling device of claim 1, wherein said cushion is formed as an integral part of said nipple.

3. The flexible coupling device of claim 1, wherein said cushion is disposed around said outer surface of said nipple in contact therewith but without connection thereto.

4. The flexible coupling device of claim 1, wherein said first elbow and said second elbow are formed of a first material and said nipple is formed of a second material, and wherein said second material is softer than said first material.

5. The flexible coupling device of claim 4, wherein said first material is polyvinyl chloride and wherein said second material is polyethylene.

6. The flexible coupling device of claim 1, wherein said first elbow further includes screw threads formed on said outer surface of said second leg at said open end thereof, and wherein said second elbow further includes screw threads formed on said outer surface of said second leg at said open end thereof.

7. The flexible coupling device of claim 1, wherein said second elbow further includes screw threads formed on said outer surface of said second leg at said open end thereof.

8. A flexible swivel coupling for connection between a sprinkler head unit and a water line in a sprinkler system, comprising a first elbow, formed as a hollow L-shaped body with a first leg open at its outer end and having an outer surface and an inner surface, and a second leg open at its outer end and having an outer surface and an inner surface, said first leg including screw threads formed on said inner surface at said open end thereof;

a second elbow, formed as a hollow L-shaped body with a first leg open at its outer end and having an outer surface and an inner surface, and a second leg open at its outer end and having an outer surface and an inner surface, said first leg including screw threads formed on said inner surface at said open end thereof; and a flexible, hollow, open ended nipple, formed of a resilient material, with a first end and a second end, said nipple having an outer surface and an inner surface, including screw threads formed on said outer surface at said first end thereof and at said second end thereof, said first end of said nipple threaded into said open end of said first leg of said first elbow and said second end of said nipple threaded into said open end of said first leg of said second elbow, said first end of said nipple being slightly larger in outside cross-sectional dimension than the inside cross-sectional dimension of said open end of said first leg of said first elbow and said second end of said nipple being slightly larger in outside cross-sectional dimension than the inside cross-sectional dimension of said open end of said first leg of said second elbow so that said threads of said nipple are compressed to form water tight seals against said threads of said first and second elbows and to maintain said seals when either or both of said elbows are rotated around the longitudinal axis of said nipple; and a resilient annular cushion with first and second ends, said cushion disposed around said outer surface of said nipple between said screw threads at said first end of said nipple and said screw threads at said second end of said nipple, such that said first end of said cushion is received against said open end of said first leg of said first elbow and said second end of said cushion is received against said open end of said first leg of said second elbow.

9. The flexible swivel coupling of claim 8, wherein said cushion is formed as an integral part of said nipple.

10. The flexible swivel coupling of claim 8, wherein said cushion is disposed around said outer surface of said nipple in contact therewith but without connection thereto.

11. The flexible swivel coupling of claim 8, wherein said elbows are rigid.

12. The flexible swivel coupling of claim 8, wherein said elbows are constructed of polyvinyl chloride and wherein said nipple is constructed of polyethylene.

13. The flexible swivel coupling of claim 8, wherein said elbows are constructed of a rigid material, said nipple is constructed of a resilient material, and said cushion is constructed of a more resilient material than said nipple.

* * * * *